United States Patent [19]

Münzner et al.

[11] 4,011,065

[45] * Mar. 8, 1977

[54] PROCESS FOR THE ENRICHMENT OF GASES

[75] Inventors: Heinrich Münzner, Essen-Kray; Heinrich Heimbach, Bochum; Werner Körbächer, Essen-Borbeck; Werner Peters, Wattenscheid; Harald Juntgen, Essen-Heisingen; Karl Knoblauch, Essen; Dieter Zündorf, Essen-Heisingen, all of Germany

[73] Assignee: Bergwerksverband GmbH, Essen, Germany

[*] Notice: The portion of the term of this patent subsequent to Apr. 2, 1991, has been disclaimed.

[22] Filed: Nov. 14, 1974

[21] Appl. No.: 523,687

Related U.S. Application Data

[63] Continuation-in-part of Ser. No. 445,319, Feb. 22, 1974, which is a continuation-in-part of Ser. No. 245,460, April 19, 1972, abandoned, and a continuation-in-part of Ser. No. 161,211, July 9, 1971, Pat. No. 3,801,513.

[30] Foreign Application Priority Data

Jan. 9, 1974 Germany .................... 2400860

[52] U.S. Cl. .................... 55/25; 55/58; 55/62; 55/74
[51] Int. Cl.² .................... B01D 15/06
[58] Field of Search ........... 55/25, 58, 62, 75, 179, 55/389

[56] References Cited

UNITED STATES PATENTS

| | | | |
|---|---|---|---|
| 3,085,379 | 4/1963 | Kayanoga et al. ................ | 55/58 |
| 3,279,153 | 10/1966 | Basmadjian et al. ............... | 55/58 |
| 3,282,028 | 11/1966 | Berlin ............................ | 55/75 |
| 3,338,030 | 8/1967 | Feldbauer ........................ | 55/58 |

FOREIGN PATENTS OR APPLICATIONS

| | | |
|---|---|---|
| 1,223,261 | 6/1960 | France |
| 407,179 | 12/1924 | Germany |

*Primary Examiner*—John Adee
*Attorney, Agent, or Firm*—Michael J. Striker

[57] ABSTRACT

An initial gaseous mixture of at least two components is passed through an adsorber which preferentially adsorbs one of the components. This initially loads the adsorber. Subsequently, another gaseous mixture, having a greater concentration of the preferentially adsorbed component than the initial gaseous mixture, is passed through the adsorber so as to additionally load the adsorber. Part of the gas in the adsorber is then removed. This initially unloads the adsorber and yields a first fraction containing both components with the concentration of the preferentially adsorbed component being greater than that in the initial gaseous mixture. Subsequently, part of the gas still remaining in the adsorber is removed so as to further unload the adsorber. This results in a second fraction including both components and wherein the concentration of the preferentially adsorbed component is greater than that in both the second gaseous mixture to be passed through the adsorber and the first fraction removed from the adsorber. Finally, the remainder of the gas in the adsorber is removed so as to completely unload the adsorber. This yields a third fraction including both components with the concentration of the preferentially adsorbed component being lower than that in the second fraction removed from the adsorber but greater than that in the initial gaseous mixture passed into the adsorber. The first and third fractions may be used for additionally loading the adsorber in a subsequent cycle. A preferred application is the enrichment of oxygen-containing gases, particularly air, which include a component of greater molecular size than oxygen. A preferred adsorber is molecular sieve coke which preferentially adsorbs the oxygen. The process permits air to be enriched to such an extent that the product fraction, namely, the second fraction, removed from the adsorber contains between 70 and 95 volume percent of oxygen.

28 Claims, 4 Drawing Figures

PROCESS FOR THE ENRICHMENT OF GASES

CROSS-REFERENCE TO RELATED APPLICATIONS

The present application is a continuation-in-part of our copending application Ser. No. 445,319 filed Feb. 22, 1974 and entitled "Process and Arrangement for the Enrichment of Gases". The latter is, in turn, a continuation-in-part of our abandoned application Serial No. 245,460 filed Apr. 19, 1972 and entitled "Process for the Enrichment of the Oxygen Content in Air and Similar Gases" as well as a continuation-in-part of our application Ser. No. 161,211 filed July 9, 1971, now Patent 3801513 and entitled "Carbon Containing Molecular Sieves".

BACKGROUND OF THE INVENTION

The invention relates generally to a process and arrangement for the enrichment of a gas containing at least two components so as to obtain a gas enriched in one of the components. More particularly, the invention relates to such a process and arrangement wherein one of the components is selectively adsorbed and subsequently desorbed to yield a gas enriched in the selectively adsorbed component. Of special interest is the oxygen-enrichment of air and similar gases by selective adsorption of the oxygen.

For recovering oxygen, there is today chiefly employed the distillation of liquid air. When it is necessary, in carrying out a process, to use a gas which, in contrast to air, has an oxygen concentration of 40 – 90% as, for instance is the case in the newer procedures utilized by the iron working industry, it is customary to obtain such oxygen enriched air by mixing air with the correspondingly necessary amount of pure oxygen. It is also possible to obtain a gas of the desired oxygen content by distillation of liquid air. All of the aforesaid processes are, however, very expensive and can be made economically acceptable to industry only by continuous operation.

It has already been proposed to recover oxygen enriched air utilizing an adsorption process employing siliceous or carbon-containing adsorption agents and involving the use of temperature or pressure changes during adsorption and desorption. Certain silicates, for example, zeolites, are effective for preferably adsorbing nitrogen from its mixtures with oxygen so that, by conducting air through a zeolite-filled adsorber, the first issuing gas is effectively enriched as regards its oxygen content. The regeneration of the zeolite, however, requires a considerable outlay for energy and apparatus. Additionally, the zeolites are completely effective only when used with dry air since they are hydrophilic.

SUMMARY OF THE INVENTION

A general object of the invention is to provide a novel process and arrangement for the enrichment of a gas containing at least two components so as to obtain a gas enriched in one of the components.

More particularly, it is an object of the invention to provide a process and arrangement for the enrichment of a gas containing at least two components wherein one of the components is selectively or preferentially adsorbed and subsequently desorbed to yield a gas enriched in the selectively adsorbed component.

Another object of the invention is to provide a process and arrangement for such enrichment whereby the enrichment may be performed in a more economical manner than was possible heretofore.

A further object of the invention is to provide a process and arrangement for such enrichment whereby the enrichment may be performed with a lower energy expenditure than was possible heretofore.

A more specific object of the invention is to provide a process and arrangement for the oxygenenrichment of air and similar gases wherein oxygen is selectively adsorbed and subsequently desorbed by lowering of the pressure to yield an oxygen enriched gas.

Still more specifically, it is an object of the invention to provide such a process and arrangement for the oxygen-enrichment of air and similar gases utilizing carbon-containing molecular sieves or molecular sieve coke as an adsorbent.

An additional object of the invention is to provide such a process and arrangement for the oxygen-enrichment of air and similar gases which does not require drying of and/or removal of impurities from the air or similar gas prior to adsorption of the oxygen.

Yet another object of the invention is to provide a process and arrangement for the oxygen-enrichment of air which may yield a gas containing between 40 and 95 volume % of oxygen.

It is also an object of the invention to provide a novel molecular sieve for use in the enrichment of gases, as well as a process of making the same.

In pursuance of the above objects, and of others which will become apparent, the invention sets forth a process for the enrichment of a gas including at least two components so as to obtain an enriched gas having an increased proportion of one of the components. In brief, the novel process comprises conveying an initial gaseous mixture including at least two components into at least one adsorber which adsorbs one of the components more readily than the other of the components. This initially loads the adsorber. The initial gaseous mixture has an initial proportion of the more readily adsorbed component. Another gaseous mixture, including the aforesaid more readily adsorbed component and having another proportion of this component which is greater than the proportion thereof in the initial gaseous mixture, is conveyed into the adsorber so as to additionally load the same. Part of the gas in the adsorber is then removed so as to initially unload the adsorber and obtain a first fraction which includes the aforesaid two components. This first fraction has a first average proportion of the more readily adsorbed component which is greater than the proportion of this component in the initial gaseous mixture. In accordance with one feature of the invention, substantially all of the remainder of the gas in the adsorber is subsequently removed. This substantially completely unloads the adsorber and results in a second fraction including both of the aforesaid two components and having a second average proportion of the more readily adsorbed component which is greater than substantially the proportion of this component in both the second gaseous mixture conveyed into the adsorber and the first fraction obtained from the adsorber. In accordance with another feature of the invention, only part of the gas remaining in the adsorber after removal of the first fraction is removed in order to obtain a second fraction. This further unloads the adsorber and the second fraction thus obtained again includes both of the aforesaid two components and again has an average second proportion of the more readily adsorbed component which is greater than substantially the proportion of this component in both the second gaseous mixture conveyed into the adsorber and the first fraction obtained from the adsorber. Here, at least part, and preferably substantially all, of the gas still remaining in the adsorber after removal of the second fraction is next removed from the adsorber so as to additionally, and preferably substantially completely, unload the adsorber. This results in a third fraction including the aforesaid two components and having an average third proportion of the more readily adsorbed component which is lower than the proportion thereof in the second fraction.

It may be seen that, in accordance with the invention, the component whose concentration is to be increased is the one which is more readily or preferentially adsorbed. This is in contrast to the known processes where that component whose concentration is to be decreased is more readily or selectively adsorbed. The invention is, therefore, of particularly great advantage in those cases where the component whose concentration is to be increased constitutes a minor fraction of the gas to be enriched, for instance, oxygen in air. The reason is that desorption of the adsorber then requires a smaller energy expenditure by virtue of the fact that a smaller quantity of gas need be desorbed. Using the oxygen enrichment of air as a basis for comparison, it is well-known that the composition of air is essentially 21 volume % oxygen and 79 volume % nitrogen. In the known processes utilizing siliceous molecular sieves, nitrogen is selectively adsorbed by the molecular sieve so that the gas emitted from the molecular sieve exhibits an increased concentration of oxygen. Here, recovery of the nitrogen requires desorption of a substantial quantity of nitrogen. On the other hand, by using the invention, oxygen will be selectively adsorbed. Recovery of the oxygen by desorption then yields an oxygen enriched gas. However, the quantity of oxygen desorbed is less than the quantity of nitrogen which must be desorbed in the aforementioned known process. Hence, the process according to the invention requires a lesser energy expenditure.

According to a favorable embodiment of the invention, the adsorber comprises a carbon-containing molecular sieve, for example, molecular sieve coke. This is advantageous since, under equilibrium conditions, carbon-containing molecular sieves take up substantially smaller amounts of water than the siliceous molecular sieves used in the prior processes. Thus, regeneration of the adsorber will not be necessary for periods ranging from several months to several years. Moreover, the fact that the carbon-containing molecular sieves take up substantially smaller amounts of water than the siliceous molecular sieves under equilibrium conditions does not hinder separation of the different constituents of a gaseous mixture such as, for example, oxygen and nitrogen in air.

The invention further provides an arrangement for the enrichment of a gas including at least two components, particularly oxygen and nitrogen, so as to obtain an enriched gas having an increased proportion of one of the components. The novel arrangement comprises at least one adsorber having an inlet end and an outlet end, and means for admitting a gaseous mixture into the inlet end so as to load the adsorber. Means for unloading the adsorber through the outlet end thereof is provided as is storage means for accommodating gaseous mixtures. The storage means may, particularly where only two fractions are recovered, be of pipe-like configuration. The arrangement also includes first conduit means for establishing communication between the outlet end of the adsorber and the storage means so as to permit flow of gaseous mixture from the adsorber into the storage means. Second conduit means is further provided for establishing communication between the storage means and the inlet end of the adsorber so as to permit flow of gaseous mixture from the storage means into the adsorber to thereby at least partially load the adsorber.

By using the arrangement in accordance with the invention, the first fraction removed from the adsorber, as well as the third fraction where this is recovered, may be temporarily stored in the storage means. These first and third fractions may then be subsequently utilized for the additional loading of the adsorber. Similarly, if more than one adsorber is used, the first and third fractions obtained from one of the adsorbers may be conveyed into the storage means and then used for the additional loading of one of the other adsorbers. Surprisingly, careful research has shown that it is advantageous, especially where only two fractions are recovered, for the storage means to be of pipe-like or tube-like configuration. This has the result that each first fraction withdrawn from an adsorber and used for the additional loading of the same or another adsorber has the same concentration profile when it is utilized for the additional loading as it had when it was initially withdrawn from an adsorber. The final results obtained are advantageously influenced thereby.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Since the oxygen enrichment of air and similar gases is of such great technical importance, the invention will be described with reference to such oxygen enrichment. However, it is to be explicitly understood that this is not intended to limit the invention in any manner and that the invention is generally applicable to the enrichment of a gaseous mixture including at least two components so as to obtain an enriched gaseous mixture having an increased proportion or concentration of one of the components.

Briefly, then, by the process in accordance with the invention, the oxygen content of air and similar gases may be enriched by selective adsorption of the oxygen from such gases onto an adsorber and subsequent desorption of the adsorbed oxygen-enriched gas by a pressure reduction. According to a favorable embodiment of the invention, the oxygen enrichment is carried out using an alternating cycle of loading and unloading of adsorbers wherein, after loading of an adsorber, 30 – 70% by volume of the total gas content of that adsorber is transferred as a first fraction into a second adsorber after the second adsorber has been loaded with air but before it has been unloaded, while from the first adsorber the residual gas volume is obtained in the form of a 40 – 90% oxygen-containing gas by further desorption, that is, by a continuation of the unloading. This corresponds to the case where two fractions are recovered. Where three fractions are recovered, the first fraction may correspond to approximately 45 to 55% by volume of the total gas content of the adsorber, the second fraction may correspond to approximately 20 to 40% by volume of this total gas content and the third fraction may correspond to approximately 10 to 30% by volume of the total gas content of the adsorber. In this case, the first and third fractions obtained from the first adsorber may be transferred to the second adsorber after the latter has been loaded with air but before it has been unloaded while the second fraction may be recovered in the form of a gas containing about 70 to 95% by volume of oxygen.

In general, the invention is particularly, although not exclusively, concerned with the enrichment of gaseous mixtures including at least two components having different molecular sizes by selective or preferential adsorption of the component of smaller molecular size. For instance, in the oxygen enrichment of gaseous mixtures of oxygen and nitrogen, the oxygen is preferentially adsorbed, that is, the component of smaller molecular size is preferentially adsorbed.

Molecular sieves capable of adsorbing that component of a gaseous mixture having a smaller molecular size can be prepared. In particular, carbon-containing molecular sieves and, more specifically, molecular sieve coke, having the ability to adsorb molecules or atoms of a given size more readily than molecules or atoms of a greater size, can be prepared. With reference to the oxygen enrichment of gaseous mixtures containing oxygen and nitrogen, it is possible to prepare molecular sieve coke which, in contrast to the zeolites mentioned earlier, have a grater capacity for adsorbing oxygen than for adsorbing nitrogen.

Due to the importance of the oxygen enrichment of air and similar gases, a process for the preparation of molecular sieve coke, hereinafter referred to as M-coke, capable of adsorbing molecules or atoms of a given size more readily than molecules or atoms of a greater size, will be described herein in some detail. Although M-coke prepared by other processes may also be used in accordance with the invention, the process to be described represents a simple and economically feasible manner of making M-coke. In brief, the process resides in decreasing the size of at least some of the pores of porous coke by the thermal decomposition of hydrocarbons so that the adsorption capacity of the coke for gases of small molecular size is not changed substantially whereas, however, the adsorption capacity of the coke for large molecules is markedly decreased.

It has now been found that coke having a content of volatile components of up to about 5%, upon treatment for a certain time at 600°–900° C with a suitable hydrocarbon, results in the formation of M-coke of excellent quality. A process for manufacturing carbon-containing molecular sieves for use in the separation of small molecular gases, in particular oxygen from nitrogen, comprises treating coke, having a content of volatile components of up to about 5%, at 600°–900° C with a hydrocarbon from which carbon splits off at these temperatures. As a result, at least some of the pores present in the coke are decreased in size. The finely dispersed carbon formed by the splitting off of carbon is deposited out in the already relatively small pores of the coke and brings about a further decrease in the pore size.

To produce M-coke suitable for separating oxygen from nitrogen, the average pore size of the ultra fine pore system should be below approximately 3 angstroms (0.3 millimicrons) after treatment. For separating even smaller gas molecules, this average pore diameter should be even smaller. By changing the intensity of the treatment of the coke with hydrocarbons which split off carbon at 600°–900° C, the average pore diameter can be adjusted according to the gas mixture to be separated with the M-coke.

The quality and suitability of the coke thus produced can be established by passing air upwardly through a tube filled with the M-coke, and having a capacity of 1 liter, for a period of 1 minute at a velocity of 30 cm/sec. and thereafter analyzing the adsorbed gas following desorption thereof by means of a vacuum.

When tested as just set out, coke produced in accordance with the invention results in a gas having a composition of 35 volume % oxygen or more and 65 volume % nitrogen or less.

In order to obtain the desired constriction or narrowing of the pores, the treatment of the coke with hydrocarbon is carried out for a period of 1 to 60 minutes, or even longer. The cooling of the heated material is most advantageously carried out in the treatment atmosphere. There can also be used during cooling streams of an inert gas, for instance, nitrogen. This accelerates the cooling and serves the additional purpose of avoiding the introduction of any oxygen during cooling. The introduction of oxygen during cooling is preferably avoided in any case.

All forms of coke containing up to 5% volatile components are suitable for treatment by the process such as cokes derived from mineral coal, including anthracite; brown coal; peat; coconut shell; and wood. The known petroleum cokes, cokes prepared by the pyrolysis of plastics and activated carbonaceous material are also suitable. In order that the gases to be separated may be able to pass through the M-coke, it is advantageous, in accordance with the invention, that the material to be subjected to the treatment have a designated particle size and, in particular a particle size from 0.1 to 20 mm.

The hydrocarbons which may be advantageously used in the treatment include the exhaust gas of a coke forming process, long distance illuminating gas, natural gas, city gas, coking gas and all of the known hydrocarbons which are thermally decomposed with the splitting off of carbon such as benzene, toluene, xylene, naphthalene, methane, ethane, hexane, cyclohexane, ethylene, acetylene, methanol, ethanol, isopropanol, ethylene chloride and tetrachlorinated hydrocarbons. Instead of using coke which is brought to the desired particle size by comminution, there can also be used, in accordance with the invention formed and shaped coke bodies. In this connection, there come into consideration spherical, cylindrical, hollow cylindrical and egg-shaped coke bodies, as well as larger coke briquettes which are reduced to the desired particle size. The manufacture of shaped coke bodies can take place using various methods:

1. Suitable coal, carbon, carbonaceous material and/or coke is briquetted according to any desirable briquette-forming technique, for instance, using 15 – 40% of a binding agent such as pitch, bitumen, tar or tar oil, and the shaped bodies thus formed coked at 600°–900° C. The briquetting can take place at normal or elevated temperatures using a stamping press, extrusion press or rolling press.

2. Coal, carbon or carbonaceous material, if necessary, in admixture with pitch, bitumen, tar or tar oil, is shaped to the form of spherical bodies having the desired size by pelletizing and the resulting pellets then coked.

The treatment in accordance with the invention can be carried out by heating cold coke to a temperature of 600°–900° C under an inert gas stream and then maintaining the coke at this temperature for an extended period of time in an atmosphere where splitting off of carbon occurs. Alternatively, the treatment can be carried out directly after coking of the starting material either in the same reactor as used for the coking operation or in a different reactor. If the coking is carried out with starting materials containing pitch, bitumen, tar or tar oil, then large amount of gaseous coking products are formed during the coking operation. If these coking products are not removed such as, for example, with a rinsing or scavenger gas, the desired atmosphere is automatically adjusted so that the gaseous coking products act as a hydrocarbon which splits off carbon. In this case, it is possible to avoid the introduction of a hydrocarbon. However, even in such cases, depending upon the character of the coke, a further increase in the separating capacity of the coke is frequently obtained by the additional introduction of a hydrocarbon.

The following Examples, which are not to be construed as limiting in any manner, are intended to illustrate the process of making M-coke.

EXAMPLE 1

Particulate mineral coal, all of the particles of which have a particle size of less than 0.08 millimeters, is treated in a fluidized bed with air at a temperature of 230° C until an oxygen content of 12% by weight is obtained. 77 parts by weight of the thus-treated coal is mixed with 23 parts by weight of soft pitch (Kramer-Sarnow softening point 52°–56° C) at about 70° C while adding water. The mixture is shaped in an extruder to the form of cylindrical bodies having a diameter of 2 millimeters and degassed in a rotating tubular oven from which air is excluded. The temperature in the oven is increased at an average of 10° C per minute until a final temperature of 800° C is reached. A stream of nitrogen is introduced into the oven when it reaches a temperature of 750° C and, after a temperature of 800° C is obtained, 100 grams of benzene per Nm$^3$ is added to the nitrogen stream. This treatment is continued for a period of 20 minutes at constant temperature. Thereafter, cooling is effected in an atmosphere of pure nitrogen. The quality test outlined above yielded a gas of the following composition: 54 volume % oxygen, and 46 volume % nitrogen. If the test is supplemented by passing a gas containing 50 volume % each of oxygen and nitrogen through the tube instead of air, then the desorbed gas has a composition of 83 volume % oxygen and 17 volume % nitrogen. Moreover, if the test is performed by passing a gaseous mixture of 23 volume % oxygen and 77 volume % argon through the tube instead of air, then the desorbed gas has a composition of 59 volume % oxygen and 41 volume % argon.

EXAMPLE 2

Particulate mineral coal, all of the particles of which have a particle size of less than 0.08 millimeters, is treated in a fluidized bed with air at a temperature of 230° C until an oxygen content of 12% by weight is obtained. 77parts by weight of the thus treated coal is mixed with 23 parts by weight of soft pitch (Kramer-Sarnow softening point 52°–56° C) at about 70° C while adding water. The mixture is shaped in an extruder to the form of cylindrical bodies having a diameter of 2 millimeters and degassed in a rotating tubular oven from which air is excluded until a volatile components content of 2% is obtained. The temperature in the oven is increased at an average of 10° C per minute until a final temperature of 800° C is reached. Thereafter, cooling to room temperature is effected while introducing nitrogen into the oven. The quality test yielded a gas of the following composition: 42 volume % oxygen and 58 volume % nitrogen.

EXAMPLE 3

80% anthracite and 20% bituminous coal is pelletized to the form of spherical particles having a diameter of 3 millimeters while applying a water spray. The anthracite has a volatile components content of 8% and the bituminous coal has a volatile components content of 20.5%. The coal is in the form of particles having a particle size of less than 0.5 millimeters and the finest particles have a size of less than 0.06 millimeters and constitute 55 to 60% of the coal. The pellets are carefully heated in a rotating tubular oven to 750° C and coked or carbonized. After a volatile components content of 3% is obtained, a stream of nitrogen, to which is added 100 grams of toluene per Nm$^3$, is passed over the pellets for a period of 30 minutes. Subsequently, the coke pellets are cooled under an inert gas stream. The quality test yielded a gas of the following composition: 37 volume % oxygen and 63 volume % nitrogen.

EXAMPLE 4

76 parts by weight of particulate wood coal, all of the particles of which have a particle size of less than 0.1 millimeters, is mixed with 24 parts by weight of soft pitch (Kramer-Sarnow softening point 52°–56° C) at about 70° C while adding water. The mixture is shaped to the form of cylindrical bodies having a diameter of 2 millimeters in an extruder and degassed in a rotating tubular oven from which air is excluded. The temperature in the oven is increased at an average of 10° C per minute until a final temperature of 800° C is reached. Thereafter, cooling to room temperature is effected while introducing nitrogen. The thus-obtained product has a volatile components content of 1.5%. The quality test yielded a gas of the following composition: 38 volume % oxygen and 62 volume % nitrogen.

EXAMPLE 5

76 parts by weight of particulate wood coal, all of the particles of which have a particle size of less than 0.1 milimeters, is mixed with 24 parts by weight of soft pitch (Kramer-Sarnow softening point 52°–56° C) at about 70° C while adding water. The mixture is shaped into the form of cylindrical bodies having a diameter of 2 millimeters and degassed in a rotating tubular oven from which air is excluded. The temperature in the oven is increased at an average of 10° C per minute until a final temperature of 800° C is reached. A stream of nitrogen is introduced when the temperature in the oven exceeds 750° C and, after a temperature of 800° C is reached, a quantity of isopropanol amounting to 100 grams per $Nm^3$ is added to the nitrogen stream. The treatment in the isopropanol nitrogen stream lasts for 20 minutes. Thereafter, cooling is effected under pure nitrogen. The quality test yielded a gas of the following composition: 49 volume % oxygen and 51 volume % nitrogen.

EXAMPLE 6

Particulate coconut shell, having a particle size between 1 and 3 millimeters, is heated to 750° C in a rotating tubular oven at a rate of 3° C per minute so that the volatile components content amounts to 4.5%. This temperature is maintained constant for a period of 30 minutes and a quantity of ethylene is introduced into the oven. Thereafter, cooling is effected under pure nitrogen. The quality test yielded a gas of the following composition: 50.5 volume % oxygen and 49.5 volume % nitrogen.

EXAMPLE 7

Particulate mineral coal, all of the particles of which have a particle size of less than 0.08 millimeters, is preoxidized in a fluidized bed with air at a temperature of 230° C until an oxygen content of 12% by weight is obtained. 77 parts by weight of the thus-treated coal is mixed with 23 parts by weight of soft pitch (Kramer-Sarnow softening point 52°–56° C) at about 70° C while adding water. The mixture is shaped to the form of cylindrical bodies having a diameter of 2 millimeters and degassed in a rotating tubular oven from which air is excluded. The temperature in the oven is increased at an average of 10° C per minute until a final temperature of 800° C is reached. Thereafter, cooling is effected to room temperature while introducing nitrogen. In a further treatment step, the thus-obtained product is again heated in a nitrogen stream to a temperature of 800° C. Then, carbonization gas generated in a coking process is added to the nitrogen stream. After 30 minutes, cooling is effected in pure nitrogen. The quality test yielded a gas of the following composition: 45 volume % oxygen and 55 volume % nitrogen.

EXAMPLE 8

Peat coke is worked up to a particle size between 1 and 3 millimeters and is heated to a temperature of 800° C in a nitrogen stream using a rotating tubular oven. Then, gaseous toluene is added to the nitrogen stream and the temperature maintained constant for 30 minutes. Subsequently, cooling is effected in a stream of pure nitrogen. The quality test yielded a gas of the following composition: 36 volume % oxygen and 64 volume % nitrogen.

The following Examples outline further tests performed with M-coke made as described above.

EXAMPLE 9

Two adsorption vessels are loaded with 20 $m^3$ of M-coke manufacturing according to Example 1. During the adsorption cycle, 6000 $m^3$ of air, which has been neither dried nor freed of carbon dioxide, is charged through each of the adsorption vessels for a period of 100 seconds at a pressure of 1.05 atmospheres. The desorption cycle also lasts for 100 seconds and takes place at a pressure of 50 torr which is achieved by suction. By alternate operation of the two adsorption vessels, a gas having a composition of 51 volume % oxygen and 49 volume % nitrogen is recovered.

EXAMPLE 10

Two adsorption vessels, similar to those used in Example 9, are loaded with 1000 ccm of M-coke manufactured according to Example 6. Adsorption is achieved by alternately pumping 28000 ccm of a gas consisting of 5 volume % He and 95 volume % $CH_4$ into each adsorption vessel at a pressure of 40 atmospheres. The time required is 30 seconds. In the second step of the procedure, the pressure is abruptly dropped to 1 atmosphere. In the third step, desorption is achieved by suction and at pressures no lower than 20 torr, 1000 ccm of a gas containing 20 volume % He and 80 volume % $CH_4$ is recovered.

For the sake of simplicity, the enrichment process of the invention will hereinafter be described with reference to M-coke as an adsorbent. However, it will be understood that other suitable adsorbents may also be used.

Proceeding now with a more detailed description of the enrichment process of the invention, one embodiment of the invention provides for performing the enrichment using a two-stage loading, i.e. adsorption, procedure and a two-stage unloading, i.e. desorption, procedure. Of course, other possibilities exist such as, for instance, single-stage loading which, however, is not a preferred procedure as will be discussed more fully below. It is also pointed out here that the invention is applicable to one, two or more adsorbers, although the use of at least two adsorbers is better for a continuous process than the use of a single adsorber.

Consider now the oxygen enrichment of air by a two-stage loading, two-stage unloading procedure. Air, constituting an initial gaseous mixture, is passed through an adsorber containing M-coke which more readily or preferentially adsorbs the oxygen in the air. This initially loads the M-coke or adsorber. The air conveyed into the adsorber has an initial proportion or concentration of the more readily adsorbed component thereof, namely, oxygen, which amounts to 21 volume %. During this loading stage, gas escapes from or flows out of the adsorber and, particularly if the adsorber is under vacuum that is, unloaded or evacuated, at the beginning of this stage, the escaping gas initially has an oxygen content of less than 21 volume % since the adsorber retains the oxygen preferentially to the nitrogen so that the nitrogen content of the escaping gas is effectively increased. However, as the loading progresses, the oxygen content of the escaping gas will increase until it attains the composition of air, this indicating that the oxygen concentration of air is no longer sufficient to further load the adsorber. If desired, the point at which the gas escaping from the adsorber attains the composition of air may be used as the termination point of the initial loading stage although this stage may be terminated prior thereto or thereafter without adverse effects.

Upon completion of the initial loading stage, another gaseous mixture having another proportion or concentration of oxygen greater than 21 volume %, i.e. greater than the initial proportion of oxygen, is conveyed into the adsorber so as to additionally load the same. The gas used in this additional loading stage may, for instance, be oxygen-enriched air having an oxygen concentration between 25 and 40, or perhaps 45, volume %. Again, gas escapes from or flows out of the adsorber during this additional loading stage. This escaping gas is gas displaced from the adsorber by the introduction of the enriched air. In this connection, it is pointed out that one of the unexpected features of the process according to the invention is that, at least during the initial part of the additional loading stage, the escaping gas has an oxygen content which is lower than, even considerably lower than, or equal to the oxygen content of air. This appears to be due to the fact that, during the adsorption in the additional loading stage, such large quantities of nitrogen are liberated, that the escaping gas contains relatively large amounts of nitrogen and, hence, has a relatively low oxygen content. This was unexpected. Preferably, the quantity of enriched air conveyed into the adsorber during the additional loading stage is so regulated that the escaping gas does not become too enriched in oxygen, that is, so that the enriched air does not escape from the adsorber. Thus, it is advantageous to terminate the additional loading stage when the escaping gas has a composition similar to that of air.

Once the adsorber has been additionally loaded, part of the gas in the adsorber is removed therefrom. This may be accomplished, for example, by effecting a pressure reduction in the adsorber as may be done by using a vacuum pump, for instance. This initially unloads the adsorber. During the initial unloading, some of the oxygen is desorbed and unadsorbed such as air and nitrogen, which were trapped in the free spaces within the adsorber during the loading stages, are also at least partially removed. The initial unloading of the adsorber yields a first fraction containing oxygen and nitrogen and having a first proportion or concentration of oxygen which is greater than that of air, that is, the proportion of oxygen in the first fraction exceeds the initial proportion of oxygen used in the initial loading stage. In fact, the oxygen content of the first fraction may be between 25 and 40 volume % (compared with 21 volume % oxygen in air). The quantity of the first fraction is advantageously between 30 and 70 volume % of the total gas content of the adsorber. This first fraction may be used for the additional loading of the adsorber in a subsequent cycle. On the other hand, if more than one adsorber is being used, the first fraction may be utilized for the additional loading stage of another adsorber. In either event, the first fraction may, if desired, be conveyed into a storage container and stored there until it is needed.

After the adsorber has been initially unloaded, the remainder of the gas in the adsorber is removed therefrom. This may, for example, be accomplished by reducing the pressure in the adsorber beyond that used in the initial unloading stage. The adsorber is thus substantially completely unloaded. During the second unloading stage, substantially all of the remaining adsorbed oxygen is desorbed and gas still trapped in the free spaces of the adsorber will also be removed. The second unloading stage yields a second fraction containing oxygen and nitrogen and having a second proportion or concentration of oxygen which exceeds substantially that of the first fraction and is greater than substantially the proportion of oxygen contained in the enriched air used for the additional loading stage. The second fraction will usually have an oxygen content between about 40 and 90 volume % and is the product which it is desired to obtain.

It will be seen from the foregoing that a two-stage unloading procedure results in a second fraction having a higher oxygen content than the first fraction. The reason for this is that the first fraction includes most of the unadsorbed air which fills the free spaces within the adsorber and, hence, the oxygen concentration of the first fraction is reduced. On the other hand, the main part of the adsorbed oxygen is liberated during the second unloading stage and is, therefore, contained in the second fraction thereby resulting in a high oxygen concentration.

As mentioned earlier, a single-stage loading procedure could be used if desired, an evacuated adsorber could conceivably be loaded by passing an oxygen-enriched gas, e.g. a gas having an oxygen content of 25 to 45 volume %, therethrough until the escaping gas attains an oxygen content of about 21 volume %, that is, an oxygen content about equal to that of air. When the adsorber is subsequently unloaded, the gas obtained would have an oxygen content between 40 and 90 volume %. Although this procedure is operative, it is not preferred since it is uneconomical in requiring too much oxygen-enriched gas. It is for this reason that a two-stage loading procedure is preferable since the adsorber may then be partially loaded using air which is a readily available source of oxygen. Thus, instead of using oxygen-enriched gas for the entire loading of the adsorber, only part of the loading need be performed with oxygen-enriched gas, i.e. the additional loading.

As will now be appreciated, it has been found that, by alternate loading and unloading, there can be recovered from each adsorber a first fraction having an oxygen content of about 25 – 40 volume % and, thereafter, a second fraction having an oxygen content of about 40 – 90 volume %, particularly where each first fraction is introduced into the same or another adsorber so as to effect an additional loading of the M-coke with oxygen-enriched air and produce an average oxygen concentration of 25 – 40 %.

In accordance with the invention, initial loading of the M-coke can be carried out with air which is not completely dry, and even using impure air. It is sufficient if the air is conducted over and through the M-coke at about atmospheric pressure for a period of 20 – 180 seconds and, preferably, 60 – 140 seconds. The loading can also take place at higher pressure, although satisfactory oxygen contents are realized even when the loading is carried out under normal pressure. As already mentioned, the completion of the initial loading can be established by analyzing the gas discharged from the adsorber and determining that point at which the gas leaving the adsorber has the same composition as the entering gas. The reduction of air through the adsorber can be continued up to the time when the discharged gas has the same composition as the gas introduced into the adsorber. The introduction of air into the adsorber can, however, be terminated before or after this point has been reached without any disadvantageous results.

In general, depending on the activity of the M-coke, air in an amount of 2 – 20 and, preferably, 4 – 12 times the volume of the adsorber may be used for the initial loading.

The unloading of the adsorber may be effected by pumping off the adsorbed gases with a vacuum pump. For the unloading, pressures from about 760 torr and down to between 200 and 400 torr may be used for desorption of the first fraction, which is between 30 and 70 volume % of the total gas in the adsorber, and pressure from between 200 and 400 torr and down to between 15 and 100 torr, preferably 30 to 50 torr, may be used for desorption of the remaining volume. Moreover, by using the invention, it is technically feasible to successively collect the desorbed gases as two fractions and to introduce the first fraction into the same or another adsorber at a desired time while recovering the remaining fraction as the product from the second unloading stage. By using efficient vacuum pumps, the first unloading stage may in general, be completed after 2 – 20 seconds and, preferably, after 9 – 17 seconds, and the second unloading stage may be completed after 20 – 180 seconds, preferably 90 – 140 seconds.

The introduction of the first fraction into the same or another adsorber which has been loaded afresh with air takes place so that large amounts of the already oxygen-enriched first fraction are not discharged from this adsorber but so that only air, or gas having a composition close to that of air, is displaced from the adsorber by the introduced gas. This displaced gas is, at most, only slightly enriched with oxygen and can be discharged as waste gas. It can, however, also be used for renewed initial loading of the adsorber from which the first fraction was obtained.

The escape of small amounts of the oxygen-enriched gas of the first fraction from the adsorber being additionally loaded thereby does not seriously effect the desired results sought to be achieved. It is recommended, however, that for the purpose of additional loading of the M-coke, the quantity of the first fraction admitted into an initially loaded adsorber be such that none of the oxygen-enriched gas will be discharged therefrom. It follows that the size of the first fraction and the adsorption capacity of the M-coke should be so related that this object is always realized as closely as possible. The additional loading can be effected very rapidly and is, in general, entirely completed after 5 – 20 seconds and, preferably, after 9 – 17 seconds.

The second fraction from the adsorber which supplied the first fraction furnishes the air having the desired oxygen enrichment, i.e., the gas having 40 – 90 volume % of oxygen, if this adsorber has previously assumed the role of the adsorber being additionally loaded with the first fraction, that is, if the alternating cycle of loading and unloading has already been set into full operation. The significance of the latter statement will become clearer later in the description.

A further improvement in the degree of enrichment of the oxygen in the air can be obtained if, before the unloading, the adsorber being unloaded is brought into communication with a completely unloaded adsorber for a short time interval of about 0.5 to 10 seconds and, preferably 1 to 3 seconds. Moreover, this measure provides a saving of energy for driving of the gas pumps.

While certain designated operating times for the individual process steps must be observed for favorable results to be obtained, the operating times for the individual process steps can, however, be varied within broad ranges.

A time plan for the operation of an arrangement having four adsorbers may, for example, be as follows:

| Absorber | 1 | 2 | 3 | 4 |
|---|---|---|---|---|
| 1–30 sec. | loading | unloading of second fraction | unloading of first fraction | additional loading fraction |
| 30–60 sec. | additional loading | loading | unloading of second fraction | unloading of first fraction |
| 60–90 sec. | unloading of first fraction | additional loading fraction | loading | unloading of second fraction |
| 90–120 sec. | unoading of second fraction | unloading of first fraction | additional loading fraction | loading |

From the above table it can be seen that, in an operation utilizing four adsorbers, the first fraction of the first adsorber may be directly introduced into the second adsorber, the first fraction from the second adsorber may be transferred into the third adsorber, etc. as is shown by the arrows.

The individual time spans for carrying out the different stages are, as will be clear, dependent on the rates at which the gases are adsorbed onto and desorbed from the M-coke, the capacity and size of the adsorber and the efficiency and capacity of the blowers and vacuum pumps. It would, therefore, be most desirable if a time independence could be achieved for the transfer of the first fraction from one adsorber into an initially loaded adsorber. This may be realized, in accordance with the invention, by pumping one or more first fractions into a storage container from which the oxygen-enriched gas may then be taken off and introduced into a desired adsorber.

Detailed experiments have been carried out and it has surprisingly been found that a considerable advantage is realized if the storage container is constructed in the form of a tube or pipe. This has the result that each first fraction has the same concentration profile when being introduced into an adsorber for the purpose of additional loading as it had when it was removed from the adsorber which supplied this first fraction. This favorably influences the final result.

Figure 1:
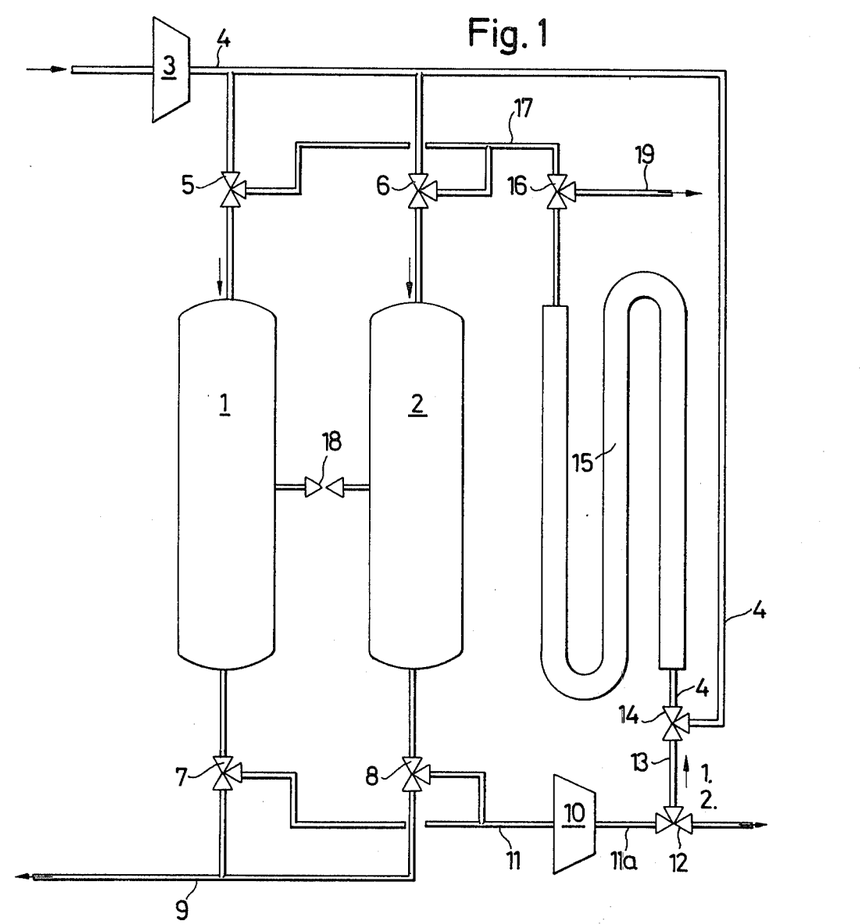
FIG. 1 is a diagrammatic representation of one form of an arrangement according to the invention which may be used for carrying out the process of the invention.

The use of a storage container which is able to accommodate only a single first fraction and which has a volume corresponding to the volume of the first fraction at normal pressure is sufficient for a particularly advantageous embodiment of the invention wherein only two adsorbers are utilized. An arrangement for carrying out this embodiment of the invention is illustrated in FIG. 1.

The arrangement includes two parallel adsorbers 1 and 2 and a storage container 15 which, via the conduits 4 and 17 and the valves 5, 6 and 16, are connected with a blower 3 for the introduction of air or the first fraction. The conduits 9 and 11, as well as the valves 7 and 8, link the adsorbers 1 and 2 with a vacuum pump 10 for discharging oxygen-depleted air or waste gas and oxygen enriched air. The conduits 11a and 13 and the valves 12 and 14 connect the vacuum pump 10 with the storage container 15 for transferring the first fraction. The adsorbers 1 and 2 are filled with M-coke. Also, in the illustrated embodiment, the storage container 15 is of tube-shaped or pipe-shaped configuration.

For starting up the system, air is blown into and through the adsorbers 1 and 2, via the conduit 4 and the valves 5 and 6, by the blower 3. The air is blown in at a pressure of, for example, 0.1 atmospheres in excess of atmospheric pressure, for a period of about 1 minute. It will be understood that the values given here are only approximate since air will be admitted into the adsorbers 1 and 2 until the escaping gas has the composition of air. The air from which oxygen has been removed is discharged from the adsorbers 1 and 2 as waste gas over the valves 7 and 8 and the conduit 9. By means of suction induced by the vacuum pump 10, and by closing the valves 6 and 7 and appropriately setting the valve 8, the first fraction is taken off from the adsorber 2 via the conduits 11 and 11a until the pressure in the adsorber 2 reaches, for instance, 300 torr. This fraction, and this applies only for start-up of the operation, is then taken off as waste gas through the valve 12. Thereafter, the second fraction, which is withdrawn from the adsorber 2 by pumping down to about 40 torr, for example, is removed from the adsorber 2 through the valve 12, the conduit 13 and the valve 14 and introduced into the storage container 15. It is pointed out that, in the start-up operation, only the second fraction, and not the first fraction, possesses an increased oxygen content. The first fraction is between 30 and 70 volume % of the total gas content of the adsorber 2 whereas the second fraction is the remainder thereof.

It will be understood that, for start-up of the operation, it is possible to use an air-oxygen mixture having about 25 – 40 volume % oxygen, which has been derived from another source, that is, it is not necessary to use an oxygen-enriched gas derived from the adsorber in the arrangement. This, incidentally, is also true for the enrichment process after start-up, although it will usually be most practical to use the oxygen enriched gas obtained from the adsorber in the arrangement.

With regard still to the start-up operation, the second fraction is now transmitted from the storage container 15 into the adsorber 1. This may be accomplished pneumatically by forcing air through the conduit 4 and valve 14 into the container 15, whereby the second fraction is forced into the adsorber 1 via valve 16, conduit 17 and valve 5. However, vacuum pumps and gas pumps are being used more and more for transmission of a fraction from the storage container 15 into the adsorbers 1 and 2.

When the transfer of a fraction from the storage container 15 into an adsorber takes place pneumatically, air thereby delivered into the storage container 15 may be discharged from the latter by the fraction admitted into the storage container 15 during the next cycle and then either be introduced into another adsorber or, via the conduit 19, discharged into the atmosphere.

In adsorber 1, there now occurs the additional loading of the M-coke filler material with simultaneous expulsion of corresponding amounts of air, or a gas having a composition similar to that of air, which is discharged as waste gas through the valve 7 and the conduit 9. In addition, the adsorber 2 is newly loaded with air (which is again admitted until the escaping gas has the composition of air). The time at which this loading of the adsorber 2 occurs will be clarified shortly.

The system has now been placed in condition for actual cyclic operation according to the invention. A first fraction (about 25 – 40% oxygen) is withdrawn from the adsorber 1 and, for the purpose of additional loading, is conveyed through the valve 7, the conduits 11, 11a and 13 and the valve 14 to the storage container 15 and, from the latter, through the valve 16, the conduit 17 and the valve 6 into the adsorber 2. The transfer of the first fraction from the storage container 15 to the adsorber 2 may be accomplished pneumatically as described above or by means of a vacuum pump or gas pump. In any event, a corresponding volume of air, or a gas having a composition similar to that of air, is expulsed from the adsorber 2 and led off as waste gas over valve 8 and conduit 9 (or withdrawn for loading of the adsorber 1). After the first fraction has been removed from the adsorber 1, the second fraction is taken off as product gas. Again, the first fraction is between 30 and 70 volume percent of the total gas content of the adsorber 1 while the second fraction is substantially the remainder thereof.

During the transfer of the first fraction and the residence thereof in the storage container 15, the loading of the adsorber 2 with air mentioned previously takes place. At the point where unloading of the adsorber 1 and loading of the adsorber 2 begins, there may, as previously mentioned, be brought about a pressure equalization between the two adsorbers via the valve 18. After completion of the transfer of the first fraction into the adsorber 2, the adsorber 2 is unloaded in two stages as previously described in connection with the adsorber 1 while, in this case, the adsorber 1 is loaded. The part of the cycle during which the adsorber 2 is unloaded and the adsorber 1 is loaded is similar to that just described where the adsorber 1 is loaded and the adsorber 2 is unloaded.

Figure 2:
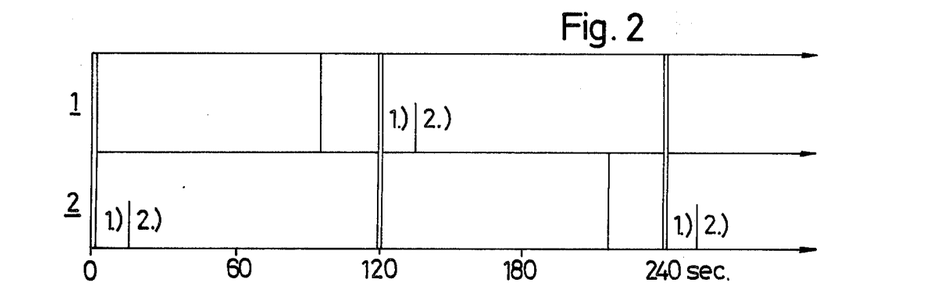
FIG. 2 represents schematically the approximate time variation of a process in accordance with the invention carried out with the arrangement of FIG. 1.

FIG. 2 represents schematically an approximate time variation for the cycle described above. As can be seen therefrom, a complete cycle may be completed in 240 seconds. In detail, FIG. 2 of the drawing shows that, for adsorbers having a capacity of about 0.5 – 20 m³ each, entirely satisfactory results can be obtained with the following operating times:

| | |
|---|---|
| Initial loading: | 20–180 seconds, preferably 60–140 seconds. |
| Unloading of the first fraction: | 2–20 seconds, preferably 9–17 seconds (corresponding pressure: about 760 down to 400–200 torr). |
| Unloading of the second fraction: | 20–180 seconds, preferably 60–140 seconds (corresponding pressure: from about 400–200 down to 100–15 torr, preferably 50–30 torr). |
| Additional loading with the first fraction: | 5–20 seconds, preferably 9–17 seconds. |

It will be understood that the foregoing time ranges assume the availability of suitable blowers and gas pumps, that is, blowers and gas pumps whose capacity and size is selected in accordance with the sizes of the adsorbers involved. In order to optimize an oxygen-enriching arrangement for two-stage fractionation or unloading as regards obtaining the maximum oxygen concentration and maximum productivity, the fractionation or unloading times specific to the particular arrangement should be very precisely determined empirically and should be very precisely adjusted in operation. The time ranges indicated above are applicable to a variety of arrangements and to a variety of cokes or molecular sieves.

If an adsorber is unloaded in different manners and the resulting time and pressure data plotted with pressure as the ordinate and time as the abscissa, a series of curves may be obtained indicating the decrease in pressure as a function of time. The curves have a form similar to that obtained by plotting out an inverted exponential function, that is, similar to the plot of an exponent raised to a negative power, and the uppermost of the curves corresponds to the lowest energy expenditure whereas the lowermost of the curves corresponds to the greatest energy expenditure. These curves are the result primarily of the time period selected for the unloading and, hence, the time period selected for the fractionation or unloading is of greater significance than the pressure range over which unloading occurs.

With regard to unloading of the first fraction, if this is unloaded within a shorter time period in one instance and within a longer time period in another instance, with the final pressure at the end of this unloading stage being the same in both cases, then the oxygen concentration in the former case will be lower than that in the latter case. Thus, since the oxygen concentration of the first fraction should not be excessively high in order that large quantities of oxygen be available for the second fraction, it is advantageous not to unload or pump off the first fraction too slowly.

On the other hand, as regards the second fraction, when the pressure reduction here is very rapid, the oxygen concentration in the product gas obtained will be higher than would be in the case if the pressure reduction were slower. Thus, in contrast to what applies for unloading of the first fraction, it is preferable if the pressure reduction during unloading of the second fraction is very rapid, that is, it is preferable for a strong pumping off action to be effected. Otherwise, there is the danger of readsorption occurring and a concomitant reduction in the oxygen concentration of the product gas.

In general, it is advantageous, according to the invention, to determine the optimum time and pressure ranges for the unloading stages and to maintain these during operation. Furthermore, it will be evident that care must be exercised to insure that the released gases, upon being withdrawn from the adsorbers, do not come into contact with molecular sieve material which may adsorb oxygen since, otherwise, the oxygen concentration may be decreased and the effects of the highly-advantageous two-stage unloading process of the invention may be lost.

The provision of a storage container for the first fraction makes it possible to carry out the process of the invention with a single adsorber which then assumes the roles of the first and second adsorbers of FIG. 1. Thus, as soon as the single adsorber has been completely unloaded, it is newly loaded with air while the first fraction is retained in the storage container until this initial loading stage has been completed. Only then is the first fraction reintroduced into the single adsorber and the process contained with the single adsorber in the manner described previously.

The use of two or more adsorbers has, in contrast to an operation using a single adsorber, the advantage that the gas and vacuum pumps can be operated without interruption and that these can, therefore, be more efficiently utilized. Hence, when using two or more adsorbers, only the valves need be operated, if necessary, by utilizing a programmed regulatory procedure.

Depending upon the size of the first fraction selected, an oxygen-containing gas, having an oxygen content between 40 and 90 volume %, is obtained by the process of the invention with an energy expenditure which is substantially lower than that required for comparable low temperature distillation plants.

It is self understood that the invention is not limited to the treatment of air but can be utilized with other oxygen-containing gases which, in addition to the oxygen, contain gas molecules of larger size. Moreover, the invention is applicable to gases having higher oxygen concentrations than that of air, for instance, to gases containing 50 volume percent oxygen.

If it is desired to obtain a still greater oxygen enrichment, that is, a gas containing 90 volume % oxygen and more, than the product gas obtained according to the embodiment under consideration may again be passed through an adsorber filled with M-coke. Evidently, it is possible instead to convey the gas containing between 40 and 90 volume percent oxygen or, in other words, the product gas, through a zeolite-filled adsorber, especially since the product gas obtained in accordance with the invention is adequately dried and purified during the course of the process and, as such, provides a good starting gas for the adsorption of nitrogen therefrom using zeolites.

The following Examples are given in order to more fully illustrate the two-stage loading, two-stage unloading embodiment of the invention but are in no manner to be construed as limiting the scope of the latter:

EXAMPLE 11

Two adsorbers filled with M-coke, and each having a capacity of 0.5 m$^3$, are alternately charged with air in a cyclic operation. Each adsorber is charged with 3.8 Nm$^3$ of air, which is conveyed through the respective adsorber for a period of 75 seconds, the inlet pressure of the air being 0.03 atmospheres in excess of atmospheric pressure. Subsequently, each adsorber is additionally loaded with a first fraction (at a time difference of about 180 seconds) and thereafter unloaded in two stages. The additional loading with a first fraction requires 15 seconds. Unloading of a first fraction, which is accomplished by means of a vacuum, requires 14 seconds. In either case, 59 volume % of the total adsorbed volume in each adsorber, as calculated on the basis of the initial loading with air and the additional loading with a first fraction, is unloaded. The unloaded first fraction has an average 38.7 volume % oxygen concentration. 41 volume %, which equals 0.45 Nm$^3$ total or 0.225 Nm$^3$ per adsorber, is removed as product gas. This gas has an oxygen concentration of 81.7 volume %.

EXAMPLE 12

Two adsorbers, each having a capacity of 3 m$^3$, and filled with an M-coke different from that used in Example 11 by virtue of possessing a lesser selectivity but a greater capacity, are alternately charged with air in a cyclic operation. Each adsorber is charged with 15 m³ of air, which is conveyed through the respective adsorber for a period of 38 seconds, the inlet pressure of the air being 0.2 atmospheres in excess of atmospheric pressure. Subsequently, each adsorber is additionally loaded with a first fraction (at a time difference of about 90 seconds) and thereafter again unloaded in two stages. The additional loading with a first fraction requires 7 seconds. The unloading of a first fraction, which is accomplished by means of a vacuum, is completed after 4 seconds (320 torr). The unloading of a second fraction requires 41 seconds (40 torr). In either case, the volume of the first fraction amounts to 35% of the total adsorbed volume in each adsorber as calculated on the basis of the initial loading with air and the additional loading with a first fraction. The unloaded first fraction has an average 26% oxygen concentration. 65 volume %, which equals 5.5 Nm³, is removed as product gas. This gas has an oxygen content of 45.5 volume %.

EXAMPLE 13

An adsorber filled with M-coke and having a capacity of 6 m³ is charged with 60 Nm³ of air for a period of 3 minutes, the inlet pressure of the air being 0.1 atmospheres in excess of atmospheric pressure. After closing the inlet valve, 50% of the adsorbed volume, corresponding to 3.7 Nm³ of gas, is removed from the adsorber with a vacuum pump (380 torr) and discharged as waste gas. Thereafter, another 3.7 Nm³ is removed as a second fraction, using a vacuum down to 30 torr, and pumped into a pipe-shaped or tube-shaped storage container. The adsorber is again charged with 60 Nm³ of air for a period of 3 minutes. Subsequently, 3.7 Nm³ from the storage container is introduced into the adsorber. This is completed after 20 seconds. Now, 50% of the adsorbed gas volume is again removed from the adsorber with the vacuum pump and this first fraction (32.3% average oxygen content) conveyed into the storage container. Thereafter, the second fraction is removed from the adsorber as product gas to obtain 3.7 Nm³ having 78% oxygen. The adsorber is again loaded with air and with the first fraction from the storage container and the operation continued as described, namely, by conveying the first fraction from the adsorber into the storage container, recovering the second fraction as a product gas and then again loading the adsorber with air.

Up to this point, the description has been primarily with respect to a two-stage loading, two-stage unloading procedure. However, it has been found that, by proceeding in accordance with the principles of the above-described process, it is possible to obtain gases having still higher oxygen contents with only relatively small additional expenditure. Hence, according to an advantageous embodiment of the invention, a two-stage loading, three-stage unloading procedure may be utilized.

The loading and unloading stages may be carried out similarly to those in the previously described embodiment of the invention although the operational parameters may be somewhat different as will be outlined more fully below. Thus, an oxygen-containing initial gas may be passed through an M-coke adsorber until the gas escaping from the adsorber has a composition approximately that of the initial gas. This initially loads the adsorber. Thereafter, another gas having a higher oxygen concentration than the initial gas may be passed through the adsorber so that the degree of oxygen loading of the adsorber is increased while, at the same time, a gas having a relatively low oxygen content is flushed out of the adsorber. After this additional loading, a first fraction, which is in the form of an oxygen-enriched gas having, comparatively, a low average oxygen concentration, may be recovered from the adsorber. As before, the oxygen concentration of the first fraction is higher than that of the initial gas. In contrast with the previously described embodiment of the invention, the present embodiment contemplates thereafter removing only part of the gas remaining in the adsorber, that is, the present embodiment provides for removing from the adsorber only part of the gas remaining therein after withdrawal of the first fraction. This yields a second fraction which is in the form of a gas having a higher average oxygen concentration and, as before, the oxygen concentration of the second fraction is greater than substantially that of the second gas conveyed through the adsorber and greater than substantially that of the first fraction. Subsequently, at least part, and preferably substantially all, of the gas still remaining in the adsorber, that is, still remaining after withdrawal of the second fraction, is removed from the adsorber. This results in a third fraction which is again in the form of a gas having a lower average oxygen concentration. This does not necessarily mean that the third fraction is not in the form of an enriched gas since the third fraction may have an oxygen concentration which is higher than that of the initial gas conveyed into the adsorber. However, the oxygen concentration of the third fraction is lower than that of the second fraction removed from the adsorber. The three fractions may be withdrawn from the adsorber by suction and withdrawal of the first fraction may correspond to initial unloading of the adsorber, withdrawal of the second fraction may correspond to further unloading of the adsorber and withdrawal of the third fraction may correspond to additional unloading of the adsorber. Preferably, withdrawal of the third fraction substantially completely unloads the adsorber.

The first and third fractions obtained by proceeding in accordance with the embodiment of the invention presently under consideration may be conveyed through an M-coke adsorber which has been loaded with oxygen, that is, these fractions may be utilized for the additional loading of an adsorber. Advantageously, the first and third fractions are passed into a supply and storage container prior to being used for additional loading of an adsorber.

Where air, in particular, is used, as the starting material or the initial gas, then, generally speaking, the average oxygen concentration of the first fraction will be approximately 25 to 70 % by volume, the average oxygen concentration of the second fraction will be approximately 70 to 95% by volume and the average oxygen concentration of the third fraction will be approximately 40 to 80% by volume. It is self-evident, however, that the oxygen concentration of the individual fractions will depend upon the oxygen concentration of the initial gas in a particular instance. For example, if one were to start with an initial gas containing about 50% by volume of oxygen, then the oxygen concentrations of the individual fractions would necessarily be correspondingly higher than the values listed above.

This embodiment of the invention is based on the recognition that M-coke, depending upon the manner in which the production process thereof has proceeded, possesses the characteristic of initially preferentially adsorbing oxygen during loading with oxygen-containing gases. Thereafter, during desorption down to underpressures of about 400 torr, the M-coke gives off gases which are relatively poor in oxygen. Subsequently, in the pressure range of approximately 50 to 400 torr, the M-coke releases gases having the highest oxygen concentration whereas, at pressures between about 0.1 and 50 torr, there occurs desorption of gases which are again poorer in oxygen.

Figure 3:
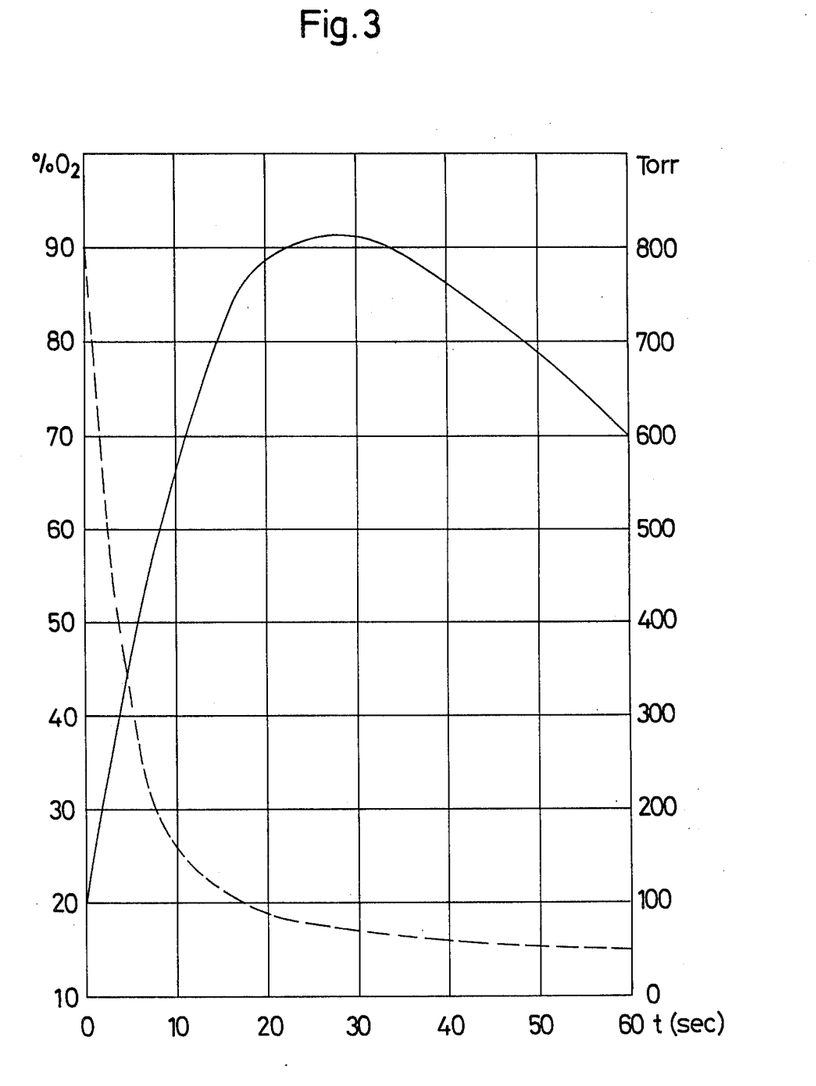
FIG. 3 illustrates desorption curves for the desorption of oxygen from molecular sieve coke.

Adsorption vessels filled with M-coke may accordingly exhibit desorption curves such as those illustrated in FIG. 3. Here, the left-hand ordinate represents the oxygen content of the desorbed gases in terms of percent by volume, the right-hand ordinate represents the pressure produced during the desorption in terms of torrs and the abscissa represents the time elapsed during the desorption in terms of seconds. The solid curve illustrates the oxygen content of the desorbed gases as a function of the desorption time whereas the dashed curve illustrates the pressure produced as a function of the desorption time. As may be seen from the curves, M-coke which has been loaded with air or other oxygen-containing gases possesses the extraordinary characteristic that, initially, as the pressure decreases (dashed curve) gases with increasing oxygen content (solid curve) are desorbed. It will be seen that the solid curve representing the oxygen content of the desorbed gases attains its highest point where the dashed curve representing the pressure reaches a value of about 80 torr. From here on, the oxygen content of the desorbed gases (solid curve) decreases with further decreasing desorption pressures (dashed curve). Consequently, gases having the highest oxygen contents may be obtained by separation of the desorbed gas fraction yielded at pressures of the order of 60 to 90 torr.

It has been further recognized that the desorption curves found for M-coke may only be realized for quantities of M-coke which do not exceed a certain volume. For quantities of M-coke corresponding to a greater volume, it is necessary for the desorbed gases to flow along relatively long paths interiorly of the M-coke in order to be released from the latter, that is, in order to be able to flow into the outlet conduits. As will be self-understood, it is possible for readsorption processes to occur along the flow paths interiorly of the M-coke and such processes will have the result that the oxygen contents of the gases obtained will not achieve the maximum values indicated on the desorption curves.

In accordance with the invention, however, it is possible to avoid this disadvantage even with larger volumes of M-coke. This may be accomplished by constructing the adsorber in such a manner as to insure that the flow paths for the adsorption and desorption gases within the M-coke filling of the adsorber are as short as possible or by providing for the inlet conduits for the adsorption gases, as well as the outlet conduits for the desorption gases, to extend into the adsorber so as to insure that the flow paths within the M-coke are as short as possible. Advantageously, the flow paths have lengths of at most about 3 meters. In practice, this may, for instance, mean that the introduction and withdrawal of the gases are undertaken at about the middle of the adsorption column or even that the inlet and outlet conduits for the gases extend into the interior of the M-coke filling of the adsorber.

Figure 4:
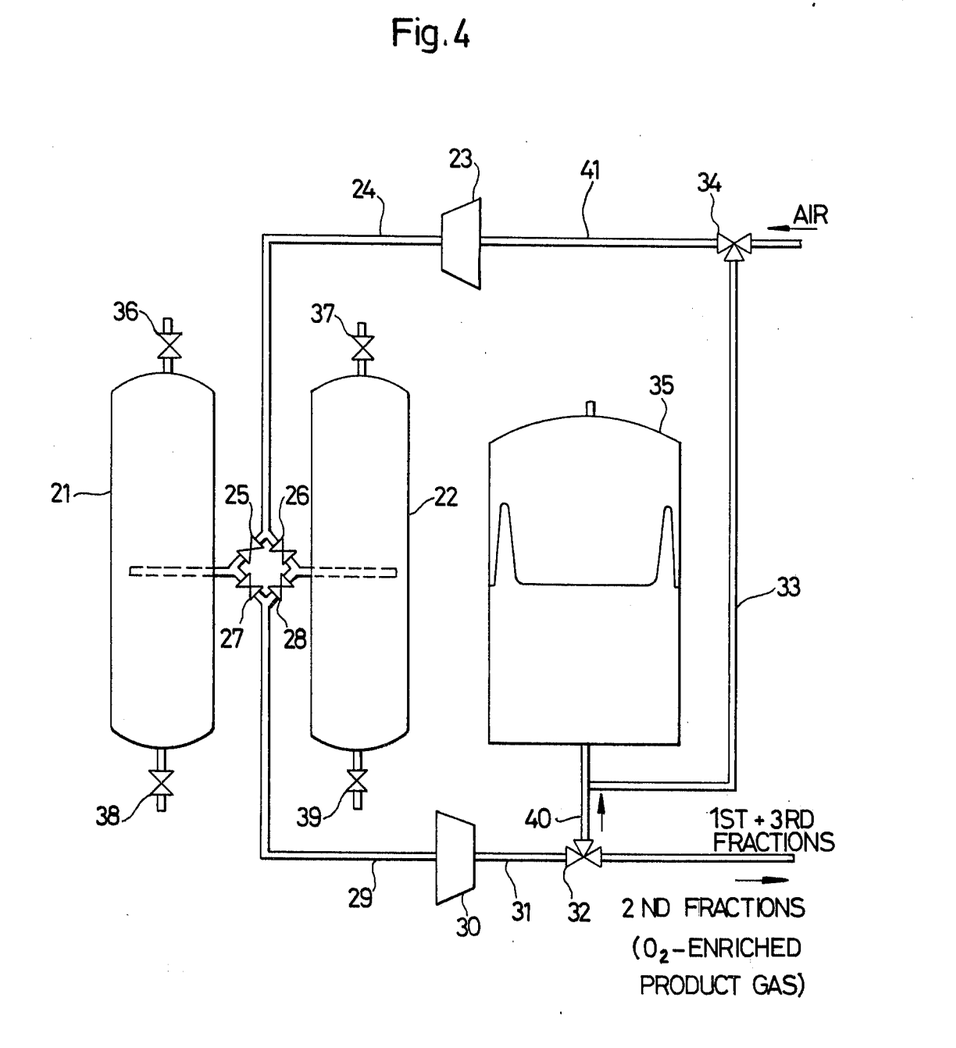
FIG. 4 is a diagrammatic representation of another form of arrangement according to the invention which may be used for carrying out the process of the invention.

This embodiment is illustrated in FIG. 4 which is also a schematic representation of another form of an arrangement according to the invention including two adsorbers. The two-stage loading, three-stage unloading procedure of the invention will be described with reference to FIG. 4 to illustrate a manner of carrying out this procedure using two adsorbers.

The arrangement includes two parallel adsorbers 21 and 22 as well as a supply and storage vessel 35 which is of variable volume. The adsorbers 21 and 22 are connected with a blower 23 via a conduit 24 and respective valves 25 and 26 whereas the vessel 35 is connected with the blower 23 via the conduits 33, 40 and 41 and the valve 34. The blower 23 serves to convey the initial gas into the adsorbers 21 and 22 as well as to convey the first and third fractions which have been stored in the vessel 35 into these adsorbers. The adsorbers 21 and 22 are further connected with a vacuum pump 30 via respective valves 27 and 28 and a conduit 29 whereas the vessel 35 is connected with the pump 30 via a conduit 31, a valve 32 and the conduit 40. The function of the pump 30 is to withdraw oxygen-enriched gases from the adsorbers 21 and 22, to convey the first and third fractions from the adsorbers 21 and 22 into the vessel 35 and to convey the oxygen-rich product gas, that is, the second fraction, from the adsorbers 21 and 22 to a a suitable, non-illustrated receiving container. The adsorber 21 is provided with valves 36 and 38 while the adsorber 22 is provided with valves 37 and 39. The valves 36, 37, 38 and 39 permit the oxygen-poor gases displaced from the adsorbers 21 and 22 during loading of the same to escape to the atmosphere.

The description herein with regard to the operation of the arrangement will be with reference to the oxygen enrichment of air. Insofar as the start-up of the arrangement is concerned, the detailed procedure for starting up an arrangement of this type has already been discussed with reference to the embodiment of FIG. 1 and need not be outlined here again. However, it is briefly pointed out that different possibilities exist for start-up. On the one hand, it is possible to initially load the evacuated adsorbers 21 and 22 with air and to thereafter effect desorption of the adsorbed gas. In such an event, only the product gas, namely the second fraction, is introduced into the vessel 35 so as to obtain an oxygen-enriched gas for subsequent use in an additional loading stage whereas the other fractions are discarded. This corresponds to the embodiment of FIG. 1 where it was pointed out that, during start-up, it is only the product fraction which is enriched. On the other hand, for start-up purposes, it is also possible, as an further initial step to introduce the first, second and third stage of oxygen-enriched gas of a second cyclic step into the vessel 15 or, to immediately fill the vessel 35 with, for example, an oxygen-nitrogen mixture containing approximately 50 % by volume of oxygen and to immediately load the adsorber 21, for instance, with such a mixture.

Assuming that the start-up operation has been completed and that the vessel 35 has been loaded with a 50 − 50 mixture of oxygen and nitrogen while the adsorber 21 has been loaded with such a mixture, the operation of the arrangement may proceed as follows where a + symbol is used to denote the closed position of a valve: The valves 25, 26, 27, 28, 36, 37, 38 and 39 are switched to the positions 25−, 26+, 27+, 28−, 36−, 27+, 38−, 39+. Thereafter, air is conveyed through the adsorber 22 by means of the blower 23 and via the valve 34 and the conduits 41 and 24. At the same time, oxygen-depleted air escapes into the atmosphere through the valves 37 and 39. As the loading phase tends to completion, the position of the valve 34 is changed so that the blower 3 is able to convey oxygen-enriched gas from the vessel 35 through the adsorber 22 via the conduits 40, 33, 41 and 24 and the valves 34 and 26. By virtue of this operation, gas having a composition approximating that of air is now displaced from the adsorber 22 through the valves 37+ and 39 + and is conveyed away as waste gas.

At the same time, the adsorber 21 which, as already mentioned, has been previously loaded with an oxygen-nitrogen mixture containing about 50% by volume of oxygen, is unloaded by desorption. The adsorbed gas in the adsorber 21 is removed from the latter in three parts or fractions and this is achieved by means of the vacuum pump 30 which withdraws the gas from the adsorber 21 via the valve 27 and conveys it through the conduits 29 and 31 to the valve 32. For the first and third fractions withdrawn from the adsorber 21, the position of the valve 32 is so adjusted that these fractions flow through the conduit 40 into the vessel 35. On the other hand, for the second fraction, which corresponds to the product gas, the position of the valve 32 is adjusted in such a manner that the second fraction is conveyed from the apparatus as a product gas. By virtue of the loading of the adsorber 21 with a 50-50 mixture of oxygen and nitrogen, the three fractions withdrawn therefrom exhibit, at a minimum, approximately the oxygen concentrations mentioned previously.

Now the adsorber 22 is desorptively unloaded in the same manner. This is accomplished by pumping three gas fractions out of the adsorber 22 by means of the gas pump 30 after switching the valves 26, 28, 37, and 39 to the positions 26−, 28+, 37−, 39−. During this unloading phase, loading of the adsorber 21 is effected by conveying air through the adsorber 21 and subsequently conveying gas from the vessel 35 through the latter.

Depending upon the operating conditions, the desired oxygen concentration of the product gas in a particular instance is obtained in a short period of time in the arrangement when using an alternating operation of this type.

The initial loading of the M-coke may be effected with air which has been neither dried nor purified. This initial loading is already adequate when air at approximately atmospheric pressure is passed through the M-coke for a period between 20 and 180 seconds and, advantageously, between 60 and 90 seconds. The loading may also be carried out at pressures in excess of atmospheric pressure although satisfactory oxygen enrichments are already achieved when this is accomplished at normal pressures. It will be self-understood that the end of the loading stage with air may be determined by analysis of the gas emitted from the adsorber during the loading so as to determine whether the oxygen concentration in the escaping gas is the same as that of the air being conveyed into the adsorber. The initial loading may be continued until a breakthrough point of 100% is achieved, that is, until the oxygen concentration of the escaping gas equals that of the gas being admitted into the adsorber. However, the loading with air may also be discontinued prior to this point without incurring any substantial disadvantages, for example, the loading may be terminated at a breakthrough point of about 95%. Depending upon the effectiveness of the M-coke, the quantity of air required for the initial loading may, in general, be between 2 and 30 times the volume of the adsorber and, advantageously, between 5 and 20 times the volume of the adsorber.

The conveying of the first and third fractions from the storage vessel into an adsorber which has been freshly loaded with air is preferably effected in such a manner that no large quantities of these already oxygen-enriched gases are again emitted from the adsorber. Thus, it is preferred for the additional loading with the first and third fractions to be carried out in such a manner that only gas having a composition similar to that of air is displaced from the adsorber during the additional loading and this displaced gas may be removed as waste gas through the valves 36, 37, 38 and 39. The additional loading with oxygen by admitting the first and third fractions into an adsorber may be effected very rapidly and is generally already finished after a period between 5 and 30 seconds and, advantageously, between 9 and 20 seconds. During the additional loading, approximately 50 to 70% by volume of the quantity of gas admitted into the adsorber is displaced from the adsorber as waste gas and is removed as waste gas. It may be mentioned here that, instead of the first and third fractions, it is also possible to use oxygen-enriched gas obtained from another source for the additional loading and such oxygen-enriched gas may likewise have an oxygen concentration of about 25 to 70% by volume.

The unloading of the adsorber may, as indicated earlier, be effected by pumping off with a vacuum pump. During the unloading, there are produced, for example, pressures from approximately 760 torr down to about 80 to 120 torr for pumping off of the first fraction. Desorption of the second fraction may occur at pressures from about 80 to 120 torr down to pressures of approximately 50 to 80 torr and, advantageously, down to pressures of about 55 to 70 torr. Desorption of the third fraction may take place at pressures from approximately 55 to 70 torr down to approximately 15 to 50 torr and, advantageously, down to about 40 to 45 torr. The quantity of the first fraction may correspond to about 45 to 55% by volume of the total gas content of the adsorber, the quantity of the second fraction may correspond to about 20 to 40% by volume of the total gas content of the adsorber and the quantity of the third fraction may correspond to about 10 to 30% by volume of the total gas content of the adsorber. When using high-capacity vacuum pumps, the first unloading stage may generally be completed between 2 and 25 seconds, advantageously, between 9 and 19 seconds, after the start of the unloading, the second unloading step may generally be completed between 25 and 90 seconds, advantageously, between 30 and 65 seconds, after the start of this unloading stage and the third unloading stage may generally be completed between 40 and 180 seconds, advantageously, between 60 and 90 seconds, after the start of this unloading stage.

While the maintenance of certain operating times may be of importance for obtaining the most favorable results, it is nevertheless true that the individual operating times may be varied between certain limits. Also, the process may be carried out using one or more adsorbers and, for instance, three to six adsorbers may be used instead of the two illustrated.

Depending upon the sizes of the first and third fractions which are selected in a particular instance, it is possible to obtain from air oxygen-containing gases having 70 to 95% by volume of oxygen and this may be accomplished with energy expenditures which are lower than those in comparable low-temperature distillation installations. It will be self-understood, as also mentioned previously, that the process of the invention is not limited to the treatment of air. Rather, other gases also come into consideration as the starting or initial gas, for example, gases containing oxygen and wherein, instead of nitrogen, there are one or more other gaseous components having a larger molecular size than oxygen.

If a still greater enrichment of oxygen in air is desired, then the product gas obtained in accordance with the invention may again be passed through an M-coke filled adsorber which has been regenerated by evacuating the same. It will be understood, of course, that instead of this, it is also possible to remove the small quantities of residual gaseous components (particularly the nitrogen) from the product gas containing 70 to 95% by volume of oxygen through the adsorption of the nitrogen by zeolites or by means of other known processes.

It will be appreciated from the foregoing that, although certain of the operating parameters may differ somewhat, there is a close similarity between the two-stage loading, two-stage unloading and two-stage, three-stage unloading embodiments of the invention.

The following Example is intended to further illustrate the two-stage loading, three-stage unloading embodiment of the invention and is not to be construed as limiting the invention in any manner:

EXAMPLE 14

Two adsorbers filled with molecular sieve coke each have a capacity of 10 cubic meters and a height of 3.40 meters. In a cyclic operation, 74 cubic meters of non-purified atmospheric air at an inlet pressure of 0.01 atmospheres in excess of atmospheric pressure is alternately passed through each of the adsorbers from the middle of the molecular sieve coke filling for a period of 45 seconds. Subsequently (with a time interval of 120 seconds), each individual adsorber is loaded for a period of 15 seconds with oxygen-enriched gas obtained from a storage vessel into which the first and third fractions obtained from a first loading stage have been pumped. Thereafter, each individual adsorber is unloaded (again with a time interval of 120 seconds) in three stages so as to obtain three fractions. The withdrawal of the first fraction by suction is completed after 16 seconds. In each case, the gas quantity of the first fraction amounts to 59% of the total volume in each adsorber as based on the loading with air and the additional loading with the first and third fractions. The average oxygen concentration of the first fraction equals 60% by volume. After removal of the first fraction, there is next obtained a product gas as a second fraction within a period of 15 seconds, the product gas having an average oxygen concentration of 81.3% by volume. The gas quantity of the second fraction is 4.7 $m^3$ which, in each case, corresponds to 20% of the total volume present in each adsorber after loading. Finally, the third fraction is removed by suction within 28 seconds and this has an average oxygen concentration of 75% by volume. The gas quantity of the third fraction amounts to 20% by volume of the total gas.

It will be understood that each of the elements described above, or two or more together, may also find a useful application in other types of processes and arrangements differing from the types described above.

While the invention has been illustrated and described as embodied in a process and arrangement for the enrichment of gases, it is not intended to be limited to the details shown, since various modifications and structual changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptions should and are intended to be comprehended within the meaning and range of equivalence of the following claims.

What is claimed as new and desired to be protected by Letters Patent is set forth in the appended claims.

1. A process for the oxygen-enrichment of air, comprising initially loading at least one adsorber with oxygen by conveying a stream of air into said one adsorber while evacuating an initial effluent gas from said one adsorber, said one adsorber adsorbing oxygen preferentially to nitrogen, and said initial effluent gas initially having a proportion of oxygen which is less than the proportion of oxygen in said air stream; terminating said initial loading when the proportion of oxygen in said initial effluent gas approximates the proportion of oxygen in said air stream; thereafter additionally loading said one adsorber with oxygen by conveying a nitrogen-containing gas stream having substantially 25 to 70 percent by volume of oxygen into said one adsorber while evacuating another effluent gas from said one adsorber, said other effluent gas initially having a proportion of oxygen which at most approximately equals the proportion of oxygen in said air stream; terminating said additional loading before the proportion of oxygen in said other effluent gas substantially exceeds the proportion of oxygen in said air stream; thereafter initially unloading said one adsorber by creating an underpressure therein so as to obtain a first fraction which has substantially 25 to 70 percent by volume of oxygen; subsequently further unloading said one adsorber at an underpressure so as to obtain a second fraction which has substantially 70 to 95 percent by volume of oxygen; thereafter additionally unloading said one adsorber at an underpressure so as to obtain a third fraction which has substantially 25 to 70 percent by volume of oxygen; recovering said second fraction as product gas; and using at least a portion of the total of said first and third fractions in a step similar to said additional loading step.

2. A process as defined in claim 1, wherein the step of additionally unloading said one adsorber comprises substantially completely unloading said one adsorber.

3. A process as defined in claim 1, wherein said one adsorber comprises molecular sieve coke.

4. A process as defined in claim 1, wherein approximately 50 to 70 percent by volume of the quantity of said nitrogen-containing gas admitted into said one adsorber is contained in said other effluent gas.

5. A process as defined in claim 1; wherein said portion of the total of said first and third fractions is readmitted into said one adsorber.

6. A process as defined in claim 1, wherein the lengths of the flow paths for gases in said one adsorber are at most about 3 meters.

7. A process as defined in claim 1, wherein said first fraction constitutes approximately 45 to 55 percent by volume of the total gas content of said one adsorber.

8. A process as defined in claim 1, wherein said second fraction constitutes approximately 20 to 40 percent by volume of the total gas content of said one adsorber.

9. A process as defined in claim 1, wherein said third fraction constitutes aproximately 10 to 30 percent by volume of the total gas content of said one adsorber.

10. A process as defined in claim 1, wherein said steps are performed with at least one additional adsorber and said additional adsorber is additionally loaded by conveying said portion of the total of said first and third fractions into said additional adsorber, said one adsorber being additionally loaded by conveying at least a portion of the total of the first and third fractions obtained from said additional adsorber into said one adsorber.

11. A process as defined in claim 10; and further comprising confining said first and third fractions prior to conveying the same into the respective adsorbers.

12. A process as defined in claim 1, wherein the step of initially loading said one adsorber is carried out for a period between approximately 20 and 180 seconds.

13. A process as defined in claim 12, wherein said period is between approximately 60 and 90 seconds.

14. A process as defined in claim 1, wherein the step of additionally loading said one adsorber is carried out for a period between approximately 5 and 30 seconds.

15. A process as defined in claim 14, wherein said period is between approximately 9 and 20 seconds.

16. The process as defined in claim 1, wherein the step of initially unloading said one adsorber is completed at a time between approximately 2 and 25 seconds after initiating unloading of said one absorber.

17. A process as defined in claim 16, wherein said time is between approximately 9 and 19 seconds after said initiation.

18. A process as defined in claim 1, wherein the step of further unloading said one adsorber is completed at a time between approximately 25 and 90 seconds after initiating said further unloading.

19. A process as defined in claim 18, wherein said time is between approximately 30 and 65 seconds after said initiation.

20. A process as defined in claim 1, wherein the step of additionally unloading said one adsorber is completed at a time between approximately 40 and 180 seconds after initiating said additional unloading.

21. A process as defined in claim 20, wherein said time is between approximately 60 and 90 seconds after said initiation.

22. A process as defined in claim 1, wherein the step of initially unloading said one adsorber is carried out at pressures ranging from approximately 760 torr to between about 80 and 120 torr.

23. A process as defined in claim 1, wherein the step of further unloading said one adsorber is carried out at pressures ranging from between approximately 80 and 120 torr to between about 50 and 80 torr.

24. A process as defined in claim 23, wherein the step of further unloading said one adsorber is carried out at pressures ranging from between approximately 80 and 120 torr to between about 55 and 70 torr.

25. A process as defined in claim 1, wherein the step of additionally unloading said one adsorber is carried out at pressures ranging from between approximately 55 and 70 torr to between about 15 and 50 torr.

26. A process as defined in claim 25, wherein the step of additionally unloading said one adsorber is carried out at pressures ranging from between approximately 55 and 70 torr to between about 40 and 45 torr.

27. A process as defined in claim 1, wherein said one adsorber comprises molecular sieve coke including porous coke particles having a particle size between approximately 0.1 and 20 millimeters; and wherein carbon is deposited in at least some of the pores of said coke particles so as to reduce the effective size of said pores to less than about 0.3 millimicrons.

28. A process as defined in claim 1, wherein said one adsorber comprises molecular sieve coke having pores of an effective size less than about 0.3 millimicrons.

* * * * *